Patented July 10, 1923.

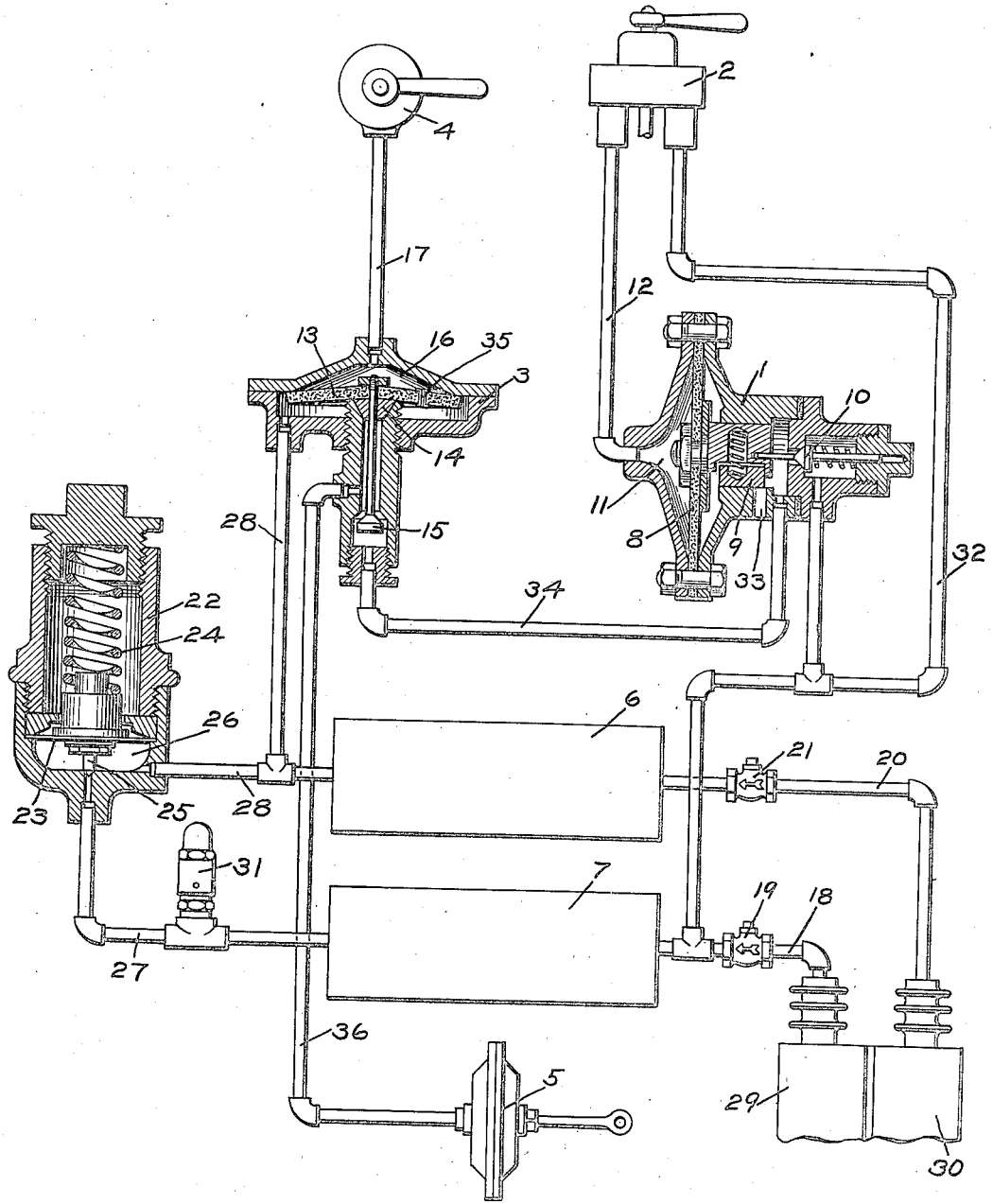

1,461,042

UNITED STATES PATENT OFFICE.

WILLIAM C. McWHIRTER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed June 29, 1922. Serial No. 571,649.

*To all whom it may concern:*

Be it known that I, WILLIAM C. MCWHIRTER, a citizen of the United States, residing at Wilkinsburg, in the county of Allegheny and State of Pennsylvania, have invented new and useful Improvements in Automotive Brakes, of which the following is a specification.

This invention relates to fluid pressure brakes, and more particularly to a fluid pressure brake system for an automotive vehicle.

The principal object of my invention is to provide a fluid pressure brake system for automotive vehicles in which a reserve supply of fluid under pressure is available for braking purposes in case of an emergency where the usual braking pressure has become depleted below the point at which the desired braking action can be obtained.

Other objects and advantages will appear in the following more detailed description of the invention.

In the accompanying drawing, the single figure is a diagrammatic view, partly in section, of an automotive vehicle fluid pressure brake system embodying my invention.

As shown in the drawing, the fluid pressure brake equipment may comprise an application and release valve device 1, adapted to be controlled by a brake valve device 2, an emergency valve device 3, adapted to be controlled by a brake valve 4, a brake cylinder 5, which may be of the diaphragm type, an emergency reservoir 6, and a service reservoir 7.

The application and release valve device 1 may comprise a casing containing a flexible diaphragm 8 adapted to operate a release slide valve 9 and a poppet type application valve 10, the diaphragm chamber 11 being connected by pipe 12 to the brake valve 2. The emergency valve device 3 may comprise a casing containing a flexible diaphragm 13 for operating an application valve 14 and a valve 15, the diaphragm chamber 16 being connected to pipe 17 leading to the brake valve device 4.

The service reservoir 7 may be charged with fluid under pressure by connecting the reservoir to one of the cylinders 29 of the internal combustion engine which drives the car, so that part of the gases under pressure generated on the explosion stroke of the engine pass through the pipe 18, past the non-return check valve 19 to the reservoir. Similarly, the emergency reservoir 6 may be charged with fluid under pressure from another engine cylinder 30, through pipe 2 containing a non-return check valve 21.

Normally, the fluid pressures of both reservoirs may be utilized for service braking, but in order to hold the pressure in the emergency reservoir 6 as a reserve in case the pressure in the service reservoir should fall below a predetermined degree, a governor device 22 is provided comprising a casing containing a diaphragm 23, subject on one side to the pressure of an adjustable spring 24 and adapted to operate a valve 25 for controlling communication from valve chamber 26 through pipe 27 to the service reservoir 7.

The valve chamber 26 is connected by pipe 28 to the emergency reservoir 6 so that the diaphragm 23 is subject to the pressure in emergency reservoir 6. A safety valve device 31 may be interposed in the pipe 27, so that if the pressure should exceed a predetermined degree, say 150 pounds, for example, the safety valve will open and relieve the reservoir of the excess pressure.

The spring 24 of the governor 22 may be adjusted for the pressure at which it is desired to cut off and retain the emergency reservoir pressure, say 60 pounds.

In operation, the reservoirs 6 and 7 are charged with fluid under pressure from the engine cylinders 29 and 30 and when the pressure in the emergency reservoir 6 has been increased slightly above 60 pounds, or the pressure at which the spring 24 may be set, the diaphragm 23 will be operated to open the valve 25, so that both reservoirs 6 and 7 are connected and fluid is supplied from both reservoirs for braking purposes so long as the pressure remains above 60 pounds.

In normal service braking, the brake valve 2 is operated and fluid is supplied from the service reservoir 7 through pipe 32 and the brake valve 2 to pipe 12 and diaphragm chamber 11. The diaphragm 8 is then operated to move the release valve 9 to close the exhaust port 33 while the application valve 10 is opened so that fluid is supplied from pipe 32 to pipe 34 leading to the valve 15 of the emergency valve device 3.

One side of the diaphragm 13 of the emergency valve device is connected to pipe 28, so that fluid from the emergency reservoir 6 is supplied thereto and fluid equalizes from this side of the diaphragm through a restricted port 35 to diaphragm chamber 16. The fluid pressures on opposite sides of the diaphragm 13 being equalized, the tension of the diaphragm holds the valve 14 closed and the valve 15 open.

Under the above conditions, fluid flows through pipe 34 past the open valve 15 to pipe 36 and the brake cylinder 5 to effect an application of the brakes.

If the pressures in the reservoirs 6 and 7 should fall below 60 pounds or the setting of the spring 24 of the governor 22, the diaphragm 23 will be operated to close the valve 25 and thereafter, the pressure in the emergency reservoir 6 will be available for emergency braking. In order to apply the brakes in emergency, the brake valve 4 is operated so as to vent fluid from diaphragm chamber 16 through pipe 17. The diaphragm 13 is then operated by the fluid pressure below the diaphragm so as to close the valve 15 and open the valve 14. Fluid under pressure from the emergency reservoir 6 is then supplied to the brake cylinder from pipe 28, past the open valve 14 to pipe 36 and thence to the brake cylinder 5.

Having now described my invention, what I claim as new and desire to secure by Letters Patent, is:—

1. In a fluid pressure brake, for automotive vehicles, the combination with a service and an emergency reservoir normally in communication and means for cutting off communication from the emergency reservoir to the service reservoir upon a predetermined reduction in pressure in the service reservoir, of a service valve device for normally controlling the supply of fluid from the service reservoir to effect an application of the brakes and an emergency valve device for controlling the supply of fluid from the emergency reservoir to effect an application of the brakes.

2. In a fluid pressure brake, for automotive vehicles, the combination with a service and an emergency reservoir normally in communication and means for cutting off communication from the emergency reservoir to the service reservoir upon a predetermined reduction in pressure in the service reservoir, of a service valve device for normally controlling the supply of fluid from the service reservoir to effect an application of the brakes and an emergency valve device for controlling the supply of fluid from the emergency reservoir to effect an application of the brakes when the pressure in the service reservoir has been reduced below the predetermined degree.

3. In a fluid pressure brake for automotive vehicles, the combination with a service reservoir from which fluid under pressure is supplied for service braking and an emergency reservoir from which fluid under pressure is supplied for emergency braking, of internal combustion engine cylinders and means for charging the service reservoir with fluid under pressure from one engine cylinder and the emergency reservoir from another engine cylinder.

4. In a fluid pressure brake for automotive vehicles, the combination with a service reservoir from which fluid under pressure is supplied for service braking and an emergency reservoir from which fluid under pressure is supplied for emergency braking, of internal combustion engine cylinders and means for charging the service reservoir with fluid under pressure from one engine cylinder and the emergency reservoir from another engine cylinder, and a governor device for opening communication between said reservoirs upon a predetermined increase in pressure in the emergency reservoirs.

In testimony whereof I have hereunto set my hand.

WILLIAM C. McWHIRTER.